United States Patent [19]

Cappels

[11] Patent Number: 4,527,201
[45] Date of Patent: Jul. 2, 1985

[54] ZOOM INDICATING APPARATUS FOR VIDEO CAMERA OR THE LIKE

[75] Inventor: Richard D. Cappels, San Jose, Calif.

[73] Assignee: Panavision, Inc., Tarzana, Calif.

[21] Appl. No.: 480,065

[22] Filed: Mar. 29, 1983

[51] Int. Cl.³ .............................................. H04N 5/30
[52] U.S. Cl. .................................. 358/224; 358/183; 358/209
[58] Field of Search ............... 358/224, 227, 225, 218, 358/209, 102, 183

[56] References Cited

U.S. PATENT DOCUMENTS

| | | | |
|---|---|---|---|
| 2,952,738 | 9/1960 | Akins | 358/224 |
| 4,234,890 | 11/1980 | Astle et al. | 358/209 |
| 4,432,014 | 2/1984 | Roos et al. | 358/224 |

OTHER PUBLICATIONS

Glen Southworth. "Outline Generator for Educational Television" *Electronics*, Apr. 3, 1959 pp. 52-53.

*Primary Examiner*—Gene Z. Rubinson
*Assistant Examiner*—Stephen Brinich
*Attorney, Agent, or Firm*—Shapiro and Shapiro

[57] ABSTRACT

A zoom indicating apparatus for a video zoom camera that provides a viewfinder raster display of a scene within the field of view of the camera superimposes upon the raster display a zoom frame that indicates the portion of the scene that would be within the field of view of the camera at its maximum zoom setting. The apparatus converts a zoom setting signal from the camera to a signal corresponding to the magnification at that zoom setting, employs the magnification signal for generating zoom frame signals which define the size and location of the zoom frame on the display, and combines the zoom frame signals with the video signal from the camera to form a composite video signal that is applied to the display. The apparatus automatically adjusts the position of the zoom frame on the display so as to compensate for misalignment between the optical axis of the camera lens and the center of the scanned image on the camera sensor tubes.

23 Claims, 9 Drawing Figures

FIG. 1A.
ZOOMED OUT

FIG. 1B.
ZOOMED IN

FIG. 5. TIMING DIAGRAM GENERATION OF TOP AND BOTTOM EDGES OF THE BOX

ZOOM INDICATING APPARATUS FOR VIDEO CAMERA OR THE LIKE

BACKGROUND OF THE INVENTION

The present invention relates generally to video cameras, and more particularly to zoom indicating apparatus for use with such cameras and similar optical systems.

Video cameras, such as television broadcast cameras, which employ zoom lenses that allow the camera operator to vary the focal length, and thus the field of view of the camera, present problems for the operator. The operator must be able to determine the current focal length of the lens, in order to determine how much zoom range is left. Although most lenses are marked to indicate their focal length setting, the operator is usually unable to see the markings from his normal operating position. With cameras that have remote zoom control, an electrical signal related to the zoom setting of the lens is available from the zoom control servo system. In the past, this signal has been applied to meters, calibrated in either percentage of maximum zoom range or directly in focal length and arranged to be easily viewed from the operator's position; or the signal has been used to display zoom setting information in the viewfinder of the camera outside of the normal field of view presentation, as by a representation of a meter needle or a line having a length proportional to the zoom setting.

Although past arrangements have provided convenient access to zoom setting information, the operator is still required to perform a difficult interpretation of the displayed information. He must determine the zoom range remaining from the current setting, and then must attempt to visualize the field of view that would be covered if the camera were zoomed in to its maximum setting. A complicating factor is that it is practically impossible to precisely align the optical axis of the lens with the center of the image scanned on a camera sensor tube. Misalignment between the optical axis of the lens and the scanned image causes objects to appear to move with respect to the center of the picture as the lens is zoomed in and out. Thus, it is difficult to estimate precisely the portion of a scene that would be within the field of view of the camera at different zoom settings.

SUMMARY OF THE INVENTION

The invention provides zoom indicating apparatus that avoids the foregoing problems, as well as zoom indicating apparatus of more general applicability. Zoom indicating apparatus in accordance with the invention provides, superimposed on a raster display, e.g., the viewfinder display of a video camera or the like, a zoom frame representative of the portion of the displayed scene within the field of view of the camera at its current zoom setting that would constitute substantially the entire field of view at the maximum zoom setting of the camera, thereby precisely indicating to an operator the area that would be covered if the camera were zoomed in to its maximum zoom setting. The size of the zoom frame is determined automatically in accordance with the current zoom setting, and provides the operator with an indication of the zoom range that is left. In more specific aspects, the invention automatically shifts the center of the zoom frame so as to compensate for misalignment between the optical axis of the lens and the center of the raster scan of the sensor tube of the camera, and the invention may be calibrated to the particular camera on which it is used so as to compensate for lens-to-lens variations in the relationship between zoom setting and lens magnification, which determines the field of view.

Briefly stated, the invention affords zoom indicating apparatus for use with an optical system such as a video camera or the like that is capable of zooming over a predetermined zoom range between a minimum zoom setting corresponding to minimum magnification of a scene or area being viewed by the system and a maximum zoom setting corresponding to maximum magnification of the scene or area, so as to vary the field of view of the system. The apparatus comprises means responsive to a zoom setting signal provided by the system for producing a size signal representative of the magnification at the current zoom setting, means for generating zoom frame signals representative of a zoom frame corresponding to the size signal, and means responsive to the zoom frame signals for superimposing the zoom frame on the raster display of the scene or area within the field of view of the system so as to indicate the portion of the scene or area that would constitute substantially the entire field of view of the system at the maximum zoom setting.

DESCRIPTION OF THE PREFERRED EMBODIMENT

The invention affords zoom indicating apparatus that is particularly well adapted for use with video cameras, e.g., television broadcast cameras, and the like, and will be described in that environment. However, as will become apparent, the invention has more general applicability, and it may be advantageously employed with any optical system of a type that affords a raster display of an area or scene within the field of view of the optical system, and that is capable of different magnifications of the area or scene being viewed.

Figure 1A:
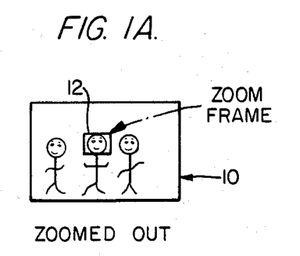
FIGS. 1A and B illustrate raster displays such as may be afforded by apparatus in accordance with the invention.
Figure 1B:
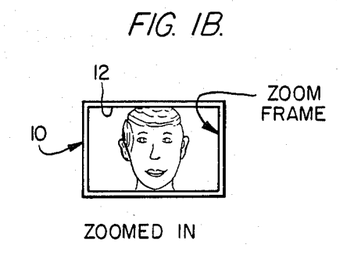

As will be described in more detail hereinafter, the invention affords zoom indicating apparatus that causes insertion into a raster display, e.g., a viewfinder display, of a scene within the field of view of a video camera or the like, a zoom frame that indicates to the camera operator the portion of the scene that would fill the display if the lens were zoomed in to its maximum zoom setting (maximum magnification). FIG. 1A shows an example of a raster display 10 when the camera is zoomed out to its minimum zoom setting (minimum magnification), and FIG. 1B illustrates the display when the camera is zoomed in to its maximum zoom setting. As shown, a zoom frame 12 is superimposed upon the display to indicate the portion of the scene currently within the field of view of the camera that would fill the picture, i.e., display, at the maximum zoom setting. When the camera is zoomed out, the zoom frame is rather small and is substantially centered on the display, as shown in FIG. 1A, whereas when the camera is zoomed in, the zoom frame encompasses substantially the entire display, as shown in FIG. 1B.

As will be described in more detail hereinafter, the size of the zoom frame is proportional to the magnification of the camera lens, the size is automatically adjusted in accordance with the zoom setting of the lens. Thus, the zoom frame indicates to the operator not only the portion of the scene that would fill the display if the lens were zoomed to its maximum zoom setting, the size of the zoom frame relative to the display also indicates to the operator the zoom range remaining between the current zoom setting and the maximum zoom setting.

Figure 2:
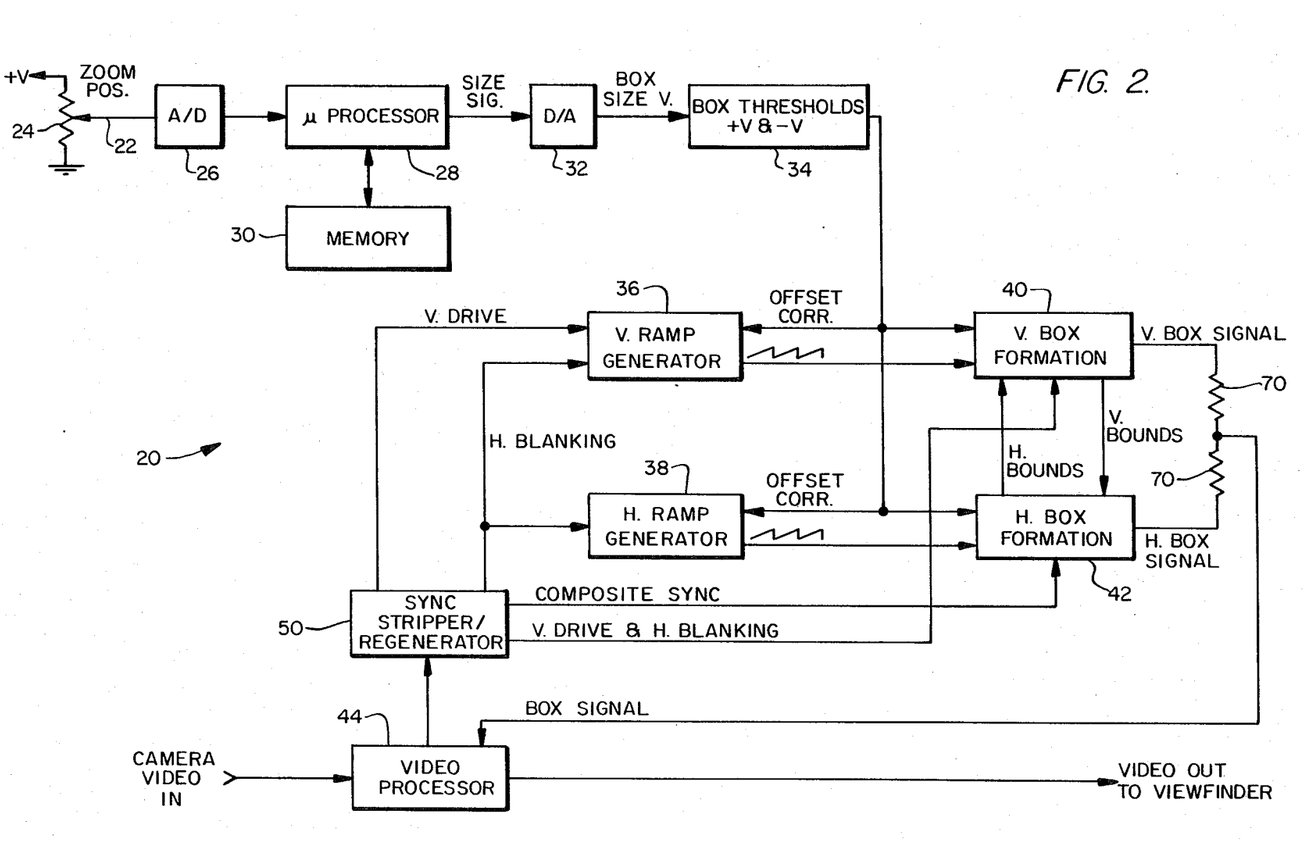
FIG. 2 is a block diagram of a preferred embodiment of zoom indicating apparatus in accordance with the invention.

FIG. 2 is a block diagram illustrating a preferred embodiment of zoom indicating apparatus 20 in accordance with the invention for producing raster displays such as illustrated in FIGS. 1A and 1B. As previously noted, in television broadcast cameras that employ electrical servo systems for providing remote zoom control, signals are available for indicating the zoom setting of the camera. Such a signal might correspond, for example, to a voltage derived from the wiper 22 of a potentiometer 24 that is coupled to the camera zoom lens (not shown), the voltage having a magnitude that corresponds to the position (axial or rotational) of the lens. As will be described in more detail shortly, the invention utilizes the zoom setting signal for producing the zoom frame and for correcting for misalignment between the optical axis of the lens and the scanned image on a camera sensor tube.

The zoom setting voltage from potentiometer 24 is converted to a digital signal by an A/D converter 26 and is supplied to a microprocessor 28 having an associated memory 30. The microprocessor and memory convert the zoom setting signal to a size signal corresponding to the magnification of the lens at its current zoom setting. The size signal is converted to an analog box size voltage by a D/A converter 32, and the box size voltage is applied to a box, i.e., zoom frame, threshold circuit 34 that generates positive and negative threshold voltages from the size voltage. The threshold voltages are supplied to vertical and horizontal ramp generators 36 and 38 (which respectively generate vertical and horizontal ramp voltages for reasons to be described), where they are used to produce offset corrections to compensate for misalignment between the optical axis of the lens and the scanned image. The threshold voltages are also supplied to vertical and horizontal box, i.e., zoom frame, formation circuits 40 and 42, respectively, which generate vertical and horizontal box signals that produce the zoom frame. The box signals are combined with the video signal from the camera in a video processor 44 to form a composite video signal which is supplied to the viewfinder display. If desired, the composite video signal may also be supplied to a video monitor, such as in a studio control room.

The apparatus may further comprise a sync stripper/regenerator 50 that receives a camera video signal from the video processor and derives from the video signal vertical drive, horizontal blanking and composite sync signals. The ramp generators 36 and 38 use the vertical drive and horizontal blanking signals for generating, respectively, vertical and horizontal ramps that are in sync with the vertical and horizontal sweeps of the raster display. The vertical drive and horizontal blanking signals are also supplied to the vertical box formation circuit 40, and the composite sync signal is supplied to the horizontal box formation circuit 42, for reasons which will be described hereinafter. The vertical box formation circuit 40 further generates a vertical bounds (V. BOUNDS) signal that is supplied to the horizontal box formation circuit 42, and the horizontal box formation circuit generates a horizontal bounds (H. BOUNDS) signal that is supplied to the vertical box formation circuit. These signals are used by the box formation circuits in generating the box signals, as will be described.

Figure 3:
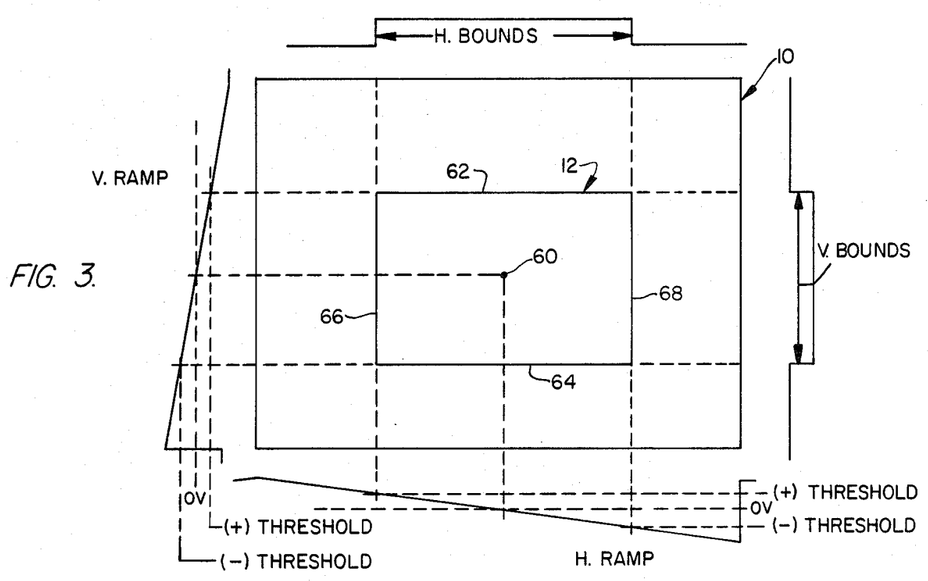
FIG. 3 is a diagrammatic view that is useful in explaining the operation of the apparatus of FIG. 2.

As shown in FIG. 2, the vertical and horizontal box formation circuits also receive, respectively, the vertical and horizontal ramps from the ramp generators. As indicated earlier, the ramps are in sync with the vertical and horizontal sweeps of the raster display. Accordingly, the vertical ramp (which as will be described later is preferably a staircase voltage) has a rate corresponding to the vertical drive rate of the display 10, and the horizontal ramp has a rate corresponding to the horizontal line rate of the display, as is indicated in FIG. 3. As is also shown in FIG. 3, the vertical and horizontal ramps are negative-going voltages that are each symmetrical, i.e., centered, about a reference voltage, which for the moment may be assumed to be 0 volts and which, as is shown in FIG. 3, corresponds to the center 60 of the raster display. As shown, the vertical ramp is positive during the upper half of the display and negative during the lower half of the display. Similarly, the horizontal ramp is positive during the left half of the display and negative during the right half.

As will be described in more detail shortly, the box formation circuits generate the vertical and horizontal box signals by comparing the vertical and horizontal ramps to the positive and negative threshold voltages produced by box threshold circuit 34. As is indicated in FIG. 3, the top edge 62 of zoom frame 12 corresponds to the point at which the decreasing vertical ramp voltage coincides with the positive threshold voltage, and the bottom edge 64 of the zoom frame corresponds to the point where the vertical ramp voltage coincides with the negative threshold voltage. Similarly, the left side 66 of the zoom frame corresponds to the point at which the decreasing horizontal ramp voltage coincides with the positive threshold voltage, and the right side 68 corresponds to the point at which the horizontal ramp voltage coincides with the negative threshold voltage. As is also shown in the figure, the vertical bounds signal is a logic signal that is high during the time it takes the vertical ramp to decrease from the positive threshold voltage to the negative threshold voltage, and, therefore, defines the vertical height of the zoom frame on the display. Similarly, the horizontal bounds signal is a logic signal that is high during the time it takes the horizontal ramp to decrease from the positive threshold voltage to the negative threshold voltage, and, therefore, defines the horizontal width of the zoom frame on the display.

As will be described hereinafter, the vertical box formation circuit 40 includes logic circuits that provide output signals having a duration equal to that of a horizontal raster line and which occur at the times of the two horizontal raster lines which have vertical positions that correspond to coincidence between the vertical ramp and the positive and negative threshold voltages, i.e., at the top and bottom edges of the zoom frame. The vertical box signals are derived from these output signals by using the horizontal bounds signal as a gate signal to limit the duration of the output signals to the portion of a horizontal line that corresponds to the correct width and horizontal position of the zoom frame. Similarly, the horizontal box formation circuit 42 includes logic circuits that provide output signals for each horizontal line of the raster at the two points where the horizontal ramp is coincident with the positive and negative threshold voltages, i.e., at the left and right sides of the zoom frame. The horizontal box signals are derived from these output signals by using the vertical bounds signal as a gate signal to limit these output signals to only those horizontal lines between the top and bottom edges of the zoom frame. The vertical and horizontal box signals from the box formation circuits are added together through resistors 70 (see FIG. 2) and are supplied to the video processor. In the video processor, the box signals cause, at the appropriate times, black level transitions in the video signal to the viewfinder display so that the zoom frame appears as a box having a black outline on the display.

In order for the zoom frame to indicate accurately to the operator the precise portion of a scene currently being displayed that would constitute substantially the entire field of view of the camera at its maximum zoom setting, it is necessary that the zoom frame have a size that is related to the actual magnification of the camera lens at the current zoom setting, and that the zoom frame be positioned on the raster display so as to compensate for misalignment between the optical axis of the lens and the center of the scanned image on the camera sensor tubes at the maximum zoom setting. The invention satisfies the first requirement by using the microprocessor 28 and memory 30 to derive from the zoom setting signal a size signal corresponding to the actual magnification of the lens; and satisfies the second requirement by generating optical axis offset correction signals for correctly positioning the zoom frame on the display. In regard to positioning of the zoom frame, the magnitude of the misalignment error varies as a function of the zoom setting. As the camera is zoomed in on a scene from its minimum zoom setting to its maximum zoom setting, the magnification varies from a minimum to a maximum value. At any point within the zoom range, the misalignment error is proportional to the product of the magnification and the error at the minimum zoom setting. As will be described shortly, the invention derives horizontal and vertical optical axis offset correction signals that are proportional to the magnification, and employs these signals for positioning the zoom frame on the display so as to compensate for the misalignment.

As noted earlier, a typical way of deriving a zoom setting signal is to couple a potentiometer to the lens so that the potentiometer setting varies as a function of the axial or rotational position of the lens. However, the relationship between focal length (and thus magnification) and lens position is substantially logarithmic rather than linear. Accordingly, if the potentiometer is a linear potentiometer, its output voltage as a function of lens position will also bear a logarithmic relationship to focal length. If instead a logarithmic potentiometer is used, its output voltage will be substantially linear with focal length. In either case, it is necessary to convert the zoom setting (position) voltage to a voltage that corresponds accurately to the lens magnification, which in turn is related to the field of view. The invention accomplishes this in the following manner.

Within memory 30 is a look-up table comprising a plurality, e.g., 16, of data storage locations for storing data values corresponding to a plurality of different zoom setting voltages between the minimum and maximum zoom settings of the lens. Each storage location is assigned a memory address that represents the magnification of the lens corresponding to the particular zoom setting voltage stored at that location. The data stored in the look-up table is specific to the particular lens and camera combination on which the zoom indicating apparatus is used, and may be derived by sequentially setting the camera lens to each of the plurality of magnification values corresponding to the storage location addresses, and loading into each location the actual zoom setting data corresponding to that address (magnification). Accordingly, the data in the look-up table is calibrated to the particular camera and lens combination on which the apparatus is used. This affords not only a more accurate conversion of the zoom setting signal to a magnification signal, but also compensates for lens-to-lens variations. Also, each stored data value and its corresponding address constitutes a data pair that defines a point in an orthogonal coordinate system, and the ensemble of data pairs in the look-up table defines a line segment approximation to a curve that represents the precise functional relationship, e.g., logarithmic, between the zoom setting signal and the lens magnification.

In operation, microprocessor 28 receives the zoom setting signal from potentiometer 24 and compares it with the data stored in the look-up table. Unless the zoom setting signal precisely matches a stored data value, the microprocessor identifies the two data values between which the zoom setting signal falls, and then performs a linear interpolation to determine the magnification value corresponding to the zoom setting signal. D/A converter 32 converts this magnification value to a corresponding voltage which is applied to box threshold circuit 34.

Figure 4:
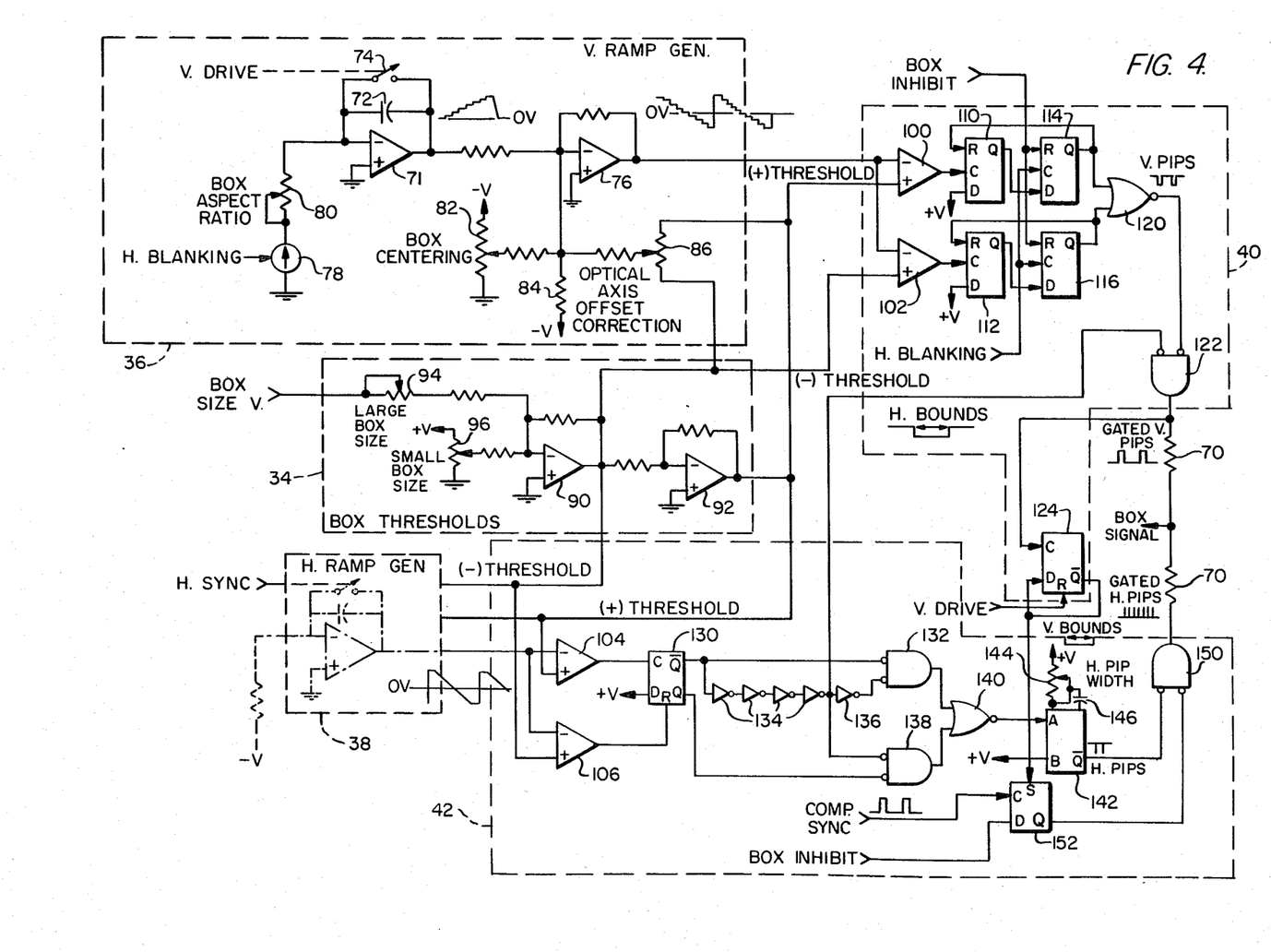
FIG. 4 is a schematic view illustrating in more detail certain portions of the apparatus of FIG. 2.
Figure 5:
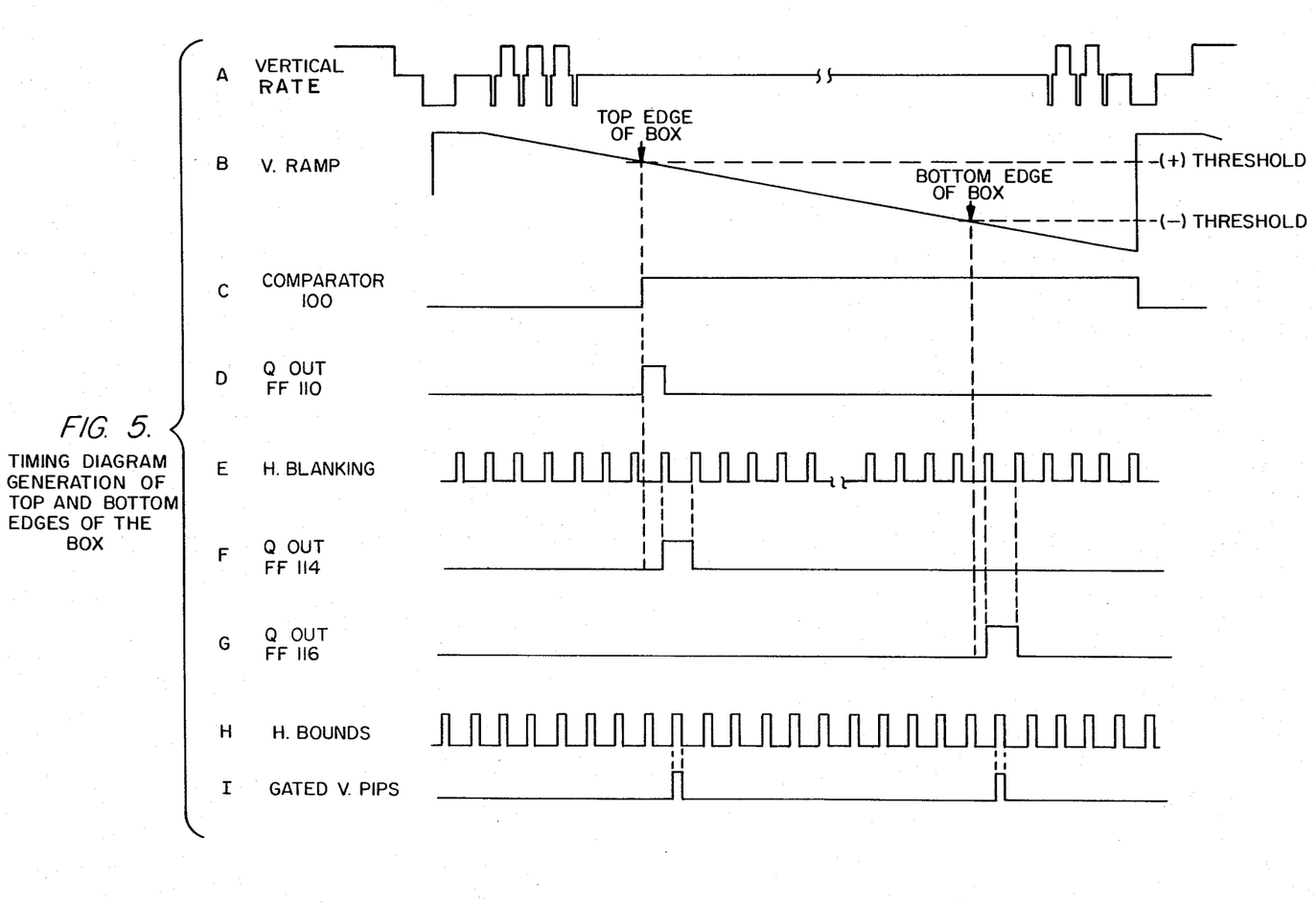
FIGS. 5 and 6 are timing diagrams that illustrate the operation of the apparatus shown in FIG. 4 in producing a zoom frame.
Figure 6:
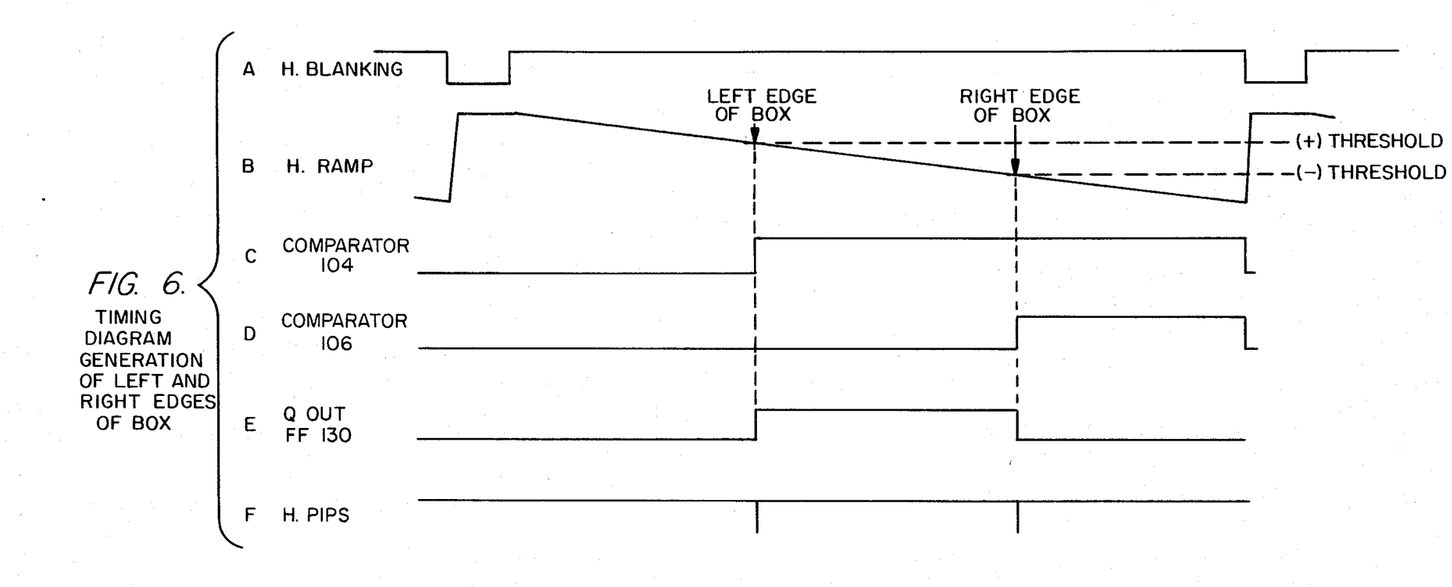

FIG. 4 illustrates in more detail the ramp generators, the box formation circuits and the box threshold circuit of the zoom indicating apparatus of FIG. 2, and FIGS. 5 and 6 are timing diagrams that illustrate the manner in which the circuits of FIG. 4 produce the box signals.

As shown in FIG. 4, vertical ramp generator 36 comprises an integrator, formed by an operational amplifier 71 and a capacitor 72, that is periodically reset by the vertical drive signal from the sync stripper/regenerator circuit 50 (see FIG. 2) which controls a switch 74 shunting the capacitor. Switch 74 may comprise a transistor that is turned on by the vertical drive signal to discharge the capacitor. An inverting amplifier 76 follows the integrator. The input to the integrator is preferably a current source 78 that is strobed on by the horizontal blanking signal so that it provides a current output only during the horizontal blanking interval. The output from the integrator is accordingly a positive-going staircase voltage, as shown, having one step per horizontal line. Transitions between steps occur during the horizontal blanking interval and the output voltage from the integrator is constant during the active video portion of each horizontal line. This results in improved vertical stability of the zoom frame. A potentiometer 80 connected between the current source and the input to amplifier 71 sets the size of the output staircase voltage (with respect to the horizontal ramp) and is adjusted for the correct box, i.e., zoom frame aspect ratio.

The positive-going staircase voltage from the integrator is summed at the input of inverting amplifier 76 with a negative voltage from a box centering potentiometer 82, a negative bias voltage supplied through a resistor 84, and an optical axis offset correction signal from a potentiometer 86. The box centering potentiometer 82 is adjusted to center the zoom frame vertically on the display at the minimum zoom setting, and the optical axis offset correction potentiometer 86 is adjusted to center the zoom frame vertically at the maximum zoom setting. As shown, the output vertical ramp from the inverter is a negative-going staircase voltage that is symmetrical with respect to a reference voltage, e.g., zero volts, that is determined by the setting of the box centering potentiometer 82, the negative bias voltage, and the value of the optical axis offset correction signal. (Hereinafter, this staircase voltage will be referred to as a "ramp"). The optical axis offset correction signal, which as previously explained has a value proportional to the magnification, serves to shift the vertical position of the ramp with respect to zero volts (the center point of the raster display) so as to compensate for the misalignment error in the vertical direction.

The horizontal ramp generator 38 may be substantially identical to the vertical ramp generator except that its integrator is driven by a constant input voltage and is reset by the horizontal sync signal; and the output from the generator is a smooth ramp voltage rather than a staircase voltage.

Box threshold circuit 34 may comprise a pair of inverting amplifiers 90, 92 that are connected in series as shown. The box size voltage, which corresponds to the magnification at the zoom setting of the lens, is supplied to the first inverter through a potentiometer 94 that is adjusted to set the maximum size of the zoom frame (at the maximum zoom setting) so that the zoom frame is approximately 90% of the maximum height and width of the display. Another potentiometer 96 on the input to the inverter is adjusted to set the minimum zoom frame size (at the minimum zoom setting). Otherwise, since the size voltage may go to zero volts, the zoom frame at minimum zoom setting would simply appear as a dot at the center of the display. The negative and positive threshold voltages from the box threshold circuit are derived, respectively, from the outputs of inverters 90 and 92. The threshold voltages are DC voltages of equal magnitude proportional to the box size voltage, i.e., magnification, but of opposite polarity. They are supplied to opposite sides of the optical axis offset correction potentiometers in each ramp generator (only potentiometer 86 in the vertical ramp generator is illustrated in FIG. 4). The optical axis offset correction signals are, therefore, also DC voltages that have a magnitude proportional to the magnification (and to the misalignment error) and a polarity so as to shift the ramp voltages with respect to zero volts (the center of the display), thereby offsetting the zoom frame vertically and horizontally so as to compensate for the misalignment error.

As shown in FIG. 4, comparators 100 and 102 in the vertical box formation circuit 40 and comparators 104 and 106 in the horizontal box formation circuit 42 compare the negative-going vertical and horizontal ramp voltages with the positive and negative threshold voltages. The outputs from comparators 100 and 102 are connected to the clock inputs of flip flops 110 and 112, respectively. The D inputs of the flip flops are connected to a logic high (+V), and their Q outputs are connected to the D inputs of flip flops 114 and 116, respectively. The Q outputs of flip flops 114 and 116 are input to a gate 120, and are also fed back to the reset inputs of flip flops 110 and 112, respectively. Flip flops 114 and 116 are clocked by the horizontal blanking signal. The output of gate 120 and the horizontal bounds signal from the horizontal box formation circuit are input to a gate 122.

Referring to the timing diagram of FIG. 5, when the negative-going vertical ramp (which for ease of illustration is shown as a continuous ramp but is preferably a staircase voltage as previously explained) coincides with the positive threshold voltage (which corresponds to the top edge of the zoom frame), the output from comparator 100 goes high (FIG. 5C) and the Q output from flip flop 110 goes high (FIG. 5D). Upon the occurrence of the positive-going edge of the next horizontal blanking pulse (FIG. 5E), the Q output of flip flop 114 goes high (FIG. 5F) and flip flop 110 is reset. The output of flip flop 114 remains high until the flip flop is clocked by the positive-going edge of the next horizontal blanking pulse, at which time it goes low since the output of flip flop 110 is low. Thus, flip flop 114 outputs a positive pulse having a duration equal to the time interval between successive horizontal blanking pulses, i.e., the time corresponding to one horizontal line. This output pulse is inverted at the output of OR gate 120 and is gated in gate 122 by the horizontal bounds signal (FIG. 5H) which, as previously described, has a width, i.e., duration, corresponding to the width of the zoom frame and a center corresponding to the horizontal center position of the zoom frame. Accordingly, the gated output of flip flop 114 is a gated vertical pip (leftmost positive pulse of FIG. 5I) corresponding to the top edge of the zoom frame.

Comparator 102 and flip flops 112 and 116 function in the same manner as comparator 100 and flip flops 110 and 114 to provide an output pulse (FIG. 5G) for the duration of the horizontal line that corresponds to the bottom edge of the zoom frame, and this pulse is similarly inverted by OR gate 120 and gated in gate 122 by the horizontal bounds signal to provide a gated vertical pip that defines the bottom edge of the zoom frame. A flip flop 124 clocked by the gated vertical pips and reset by the vertical drive signal produces the vertical bounds signal, which corresponds to the vertical height and vertical position of the zoom frame, as previously described.

In the horizontal box formation circuit 42, the output of comparator 104 clocks a flip flop 130 which is reset by the output from comparator 106. The $\overline{Q}$ output from the flip flop is supplied to one input of a gate 132 and through a plurality of inverters 134 and an inverter 136 connected in series, as shown, to afford a slight propagation delay, to the other input of the gate. The output of the series connected inverters 134 is the horizontal bounds signal. The Q output of flip flop 130 and the horizontal bounds signal from the series-connected inverters 134 are input to another gate 138, and the outputs of gates 132 and 138 are input to an inverting gate 140. The output from gate 140 drives a one-shot multivibrator 142 that outputs narrow, negative-going horizontal pip voltage pulses, the width of which is determined by the setting of a potentiometer 144 and a capacitor 146. The horizontal pips from the one-shot are input to a gate 150 along with the output from a flip flop 152 that is clocked by the composite sync signal and set by the vertical bounds signal, as shown.

The timing diagram of FIG. 6 illustrates the operation of the horizontal box formation circuit. When the negative-going horizontal ramp coincides with the positive threshold voltage, which defines the left edge of the zoom frame, the output from comparator 104 goes high (FIG. 6C) and the Q output of flip flop 130 goes high (FIG. 6E). This causes the one-shot to output a negative horizontal pip pulse (FIG. 6F). When the horizontal ramp voltage decreases further and coincides with the negative threshold voltage, which defines the right edge of the zoom frame, the output from comparator 106 goes high (FIG. 6D), which resets flip flop 130 (FIG. 6E). This causes the one-shot to output another horizontal pip, corresponding to the right edge of the zoom frame, as shown.

The one-shot multivibrator outputs horizontal pips corresponding to the left and right edges of the zoom frame during each horizontal line of the display. These horizontal pips are gated in gate 150 by the vertical bounds signal via flip flop 152, so that the gated horizontal pips from gate 150 occur only for those horizontal lines between the top and bottom edges of the zoom frame. The gated vertical pips from gate 122 and the gated horizontal pips from gate 150 are added together through resistors 70 to form the box signal which is supplied to the video processor. The display of the zoom frame may be disabled by applying a logic high to the BOX INHIBIT inputs to flip flops 114, 116 and 152.

Figure 7:
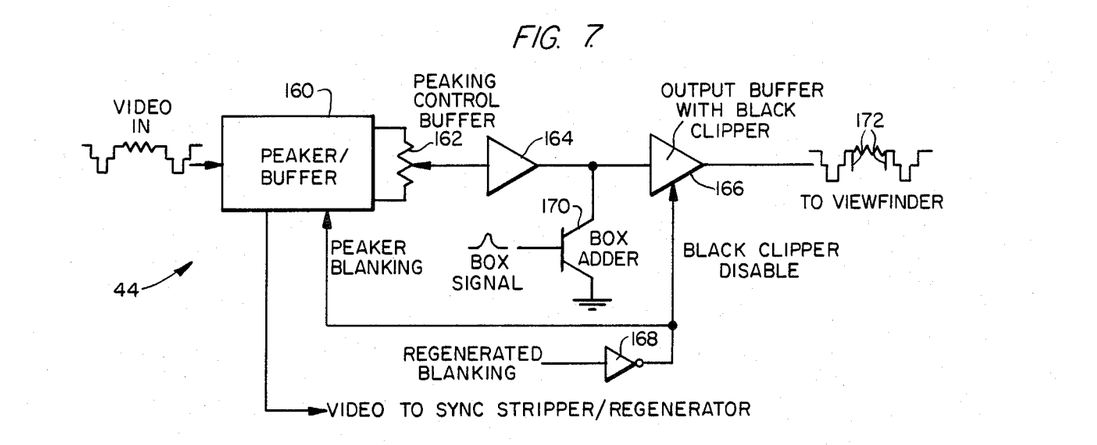
FIG. 7 is a block diagram of a video processor of the apparatus in FIG. 2.

FIG. 7 is a block diagram of the video processor 44. The video signal from the camera is input to a peaker/buffer amplifier 160 having a peaking control potentiometer 162, and an output from the peaker/buffer amplifier is supplied to the sync stripper/regenerator circuit. As is well known, the peaker responds to certain frequencies to enhance the edges of the video signal. The output from the peaking control potentiometer 162 is applied to a buffer amplifier 164 and thence to an output buffer amplifier 166 having a black-level clipper for limiting the negative-most excursion of the video signal to the viewfinder. An inverter amplifier 168, receiving a regenerated blanking signal, disables the black clipper and the peaker during the blanking intervals. The box signal, comprising the gated vertical and horizontal pips, is used to turn on a box adder transistor 170 that has its collector connected to the output from buffer amplifier 164. When the transistor conducts, it grounds the output of the buffer amplifier, which produces a black-level transition 172 in the video signal to the viewfinder. Thus, the zoom frame appears as a box having a black outline on the display.

Figure 8:
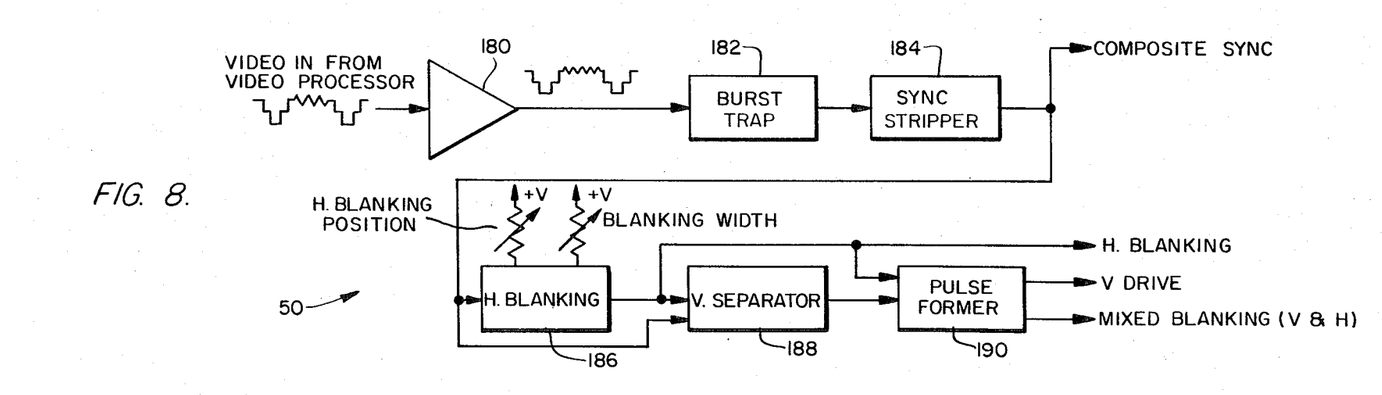
FIG. 8 is a block diagram of a sync stripper/regenerator of the apparatus of FIG. 2.

FIG. 8 illustrates in block diagram form a generally conventional sync stripper/regenerator circuit 50. The video signal from the video processor is input through a buffer amplifier 180 and a color burst trap 182 to a sync stripper circuit 184 that strips the horizontal and vertical sync signals from the video signal and outputs a composite sync signal. The composite sync signal triggers a horizontal blanking circuit 186 having horizontal blanking position and blanking width controls, the output of which is the horizontal blanking signal. The horizontal blanking signal and the composite sync signal are compared in a vertical separator circuit 188 which, during the vertical sync interval, will generate a string of pulses that will trigger a pulse forming circuit 190 to produce vertical drive pulses and mixed horizontal and vertical blanking pulses. The various signals from the sync stripper/regenerator are supplied to the ramp generators and the box formation circuits for the purposes previously explained.

From the foregoing, it will be appreciated by those skilled in the art that the invention is applicable not only to cameras, per se, but also to other optical systems that are capable of variable magnification and which afford a raster display of an image within the field of view of the optical system. Furthermore, while a preferred embodiment of the invention has been shown and described, it will be apparent to those skilled in the art that changes can be made in the embodiment without departing from the principles and spirit of the invention, the scope of which is defined in the appended claims.

The invention claimed is:

1. Zoom indicating apparatus for use with an optical system capable of zooming over a predetermined zoom range between a minimum zoom setting corresponding to minimum magnification of an area being viewed by the system and a maximum zoom setting corresponding to maximum magnification of the area, the system providing a zoom signal corresponding to the current zoom setting, and providing a raster display of the area within the field of view of the system at the current zoom setting, the apparatus comprising means responsive to the zoom signal for producing a size signal representative of the magnification at the current zoom setting, means for generating zoom frame signals representative of a zoom frame corresponding to the size signal, and means responsive to the zoom frame signals for superimposing the zoom frame on the raster display so as to indicate a portion of the area that would constitute substantially the entire field of view of the system at said maximum zoom setting.

2. The apparatus of claim 1, wherein the producing means comprises means for comparing the value of the zoom signal to a plurality of zoom setting values corresponding to different magnifications and for producing said size signal in response to said comparing.

3. The apparatus of claim 2, wherein the producing means comprises means, operative upon no coincidence being detected between the value of the zoom signal and a zoom setting value of the plurality, for identifying a pair of zoom setting values which are, respectively, greater than and less than the value of the zoom signal and for interpolating between said pair of zoom setting values to determine the magnification corresponding to the zoom signal value.

4. The apparatus of claim 3, wherein said producing means comprise a microprocessor having a memory for storing a plurality of zoom setting values at a plurality of storage locations, each location having an address representing a different magnification.

5. The apparatus of claim 4, wherein there is a predetermined functional relationship between zoom setting and magnification, and wherein the stored zoom setting values and their corresponding addresses define an approximation to a characteristic curve representative of such functional relationship.

6. The apparatus of claim 5, wherein each zoom setting value corresponds to a position of a zoom lens of the system, and wherein said functional relationship is substantially logarithmic.

7. The apparatus of claim 4, wherein the zoom setting value stored at each address corresponds to the zoom signal produced by the system upon being set to the magnification corresponding to such address.

8. The apparatus of claim 4, wherein said microprocessor is operative to perform a linear interpolation between said pair of zoom setting values to determine the magnification corresponding to the zoom signal.

9. The apparatus of claim 1, wherein the system includes means for raster scanning an image produced by a zoom lens on a sensor to generate video signals representative of the image, and wherein said zoom frame signals generating means includes means for applying offset correction signals to the zoom frame signals to position the zoom frame on the display so as to compensate for misalignment between an optical axis of the zoom lens and the center of the raster scanned image.

10. The apparatus of claim 9, wherein said applying means comprises means for deriving said offset correction signals such that they are proportional to the magnification at the current zoom setting.

11. The apparatus of claim 1, further comprising horizontal and vertical ramp generators for generating, respectively, a horizontal ramp synchronized to the raster display horizontal line rate, and a vertical ramp synchronized to the raster display vertical rate, threshold means for producing from said size signal first and second thresholds, and means for comparing each of said horizontal and vertical ramps with said first and second thresholds and for providing respective horizontal and vertical zoom frame signals upon the ramps attaining values corresponding to the thresholds.

12. The apparatus of claim 11, wherein said first and second thresholds comprise, respectively, voltages of equal magnitude proportional to the magnification at the current zoom setting, but of opposite polarity.

13. The apparatus of claim 12 further comprising means for deriving offset correction signals from said thresholds to position the zoom frame on the display so as to compensate for misalignment error between an optical axis of a zoom lens of the system and the center of a raster scanned image on a sensor of the system.

14. The apparatus of claim 13, wherein said offset correction signals comprise a horizontal offset correction voltage for varying the position of the horizontal ramp with respect to a first voltage that corresponds to the horizontal center of the display, and a vertical offset correction voltage for varying the position of the vertical ramp with respect to a second voltage that corresponds to the vertical center of the display.

15. The apparatus of claim 14, wherein said horizontal and vertical offset correction voltages are voltages proportional to the magnification at the current zoom setting and to the misalignment error.

16. The apparatus of claim 11, wherein the vertical ramp generator comprises a staircase generator that generates a staircase voltage having successive values corresponding to the positions of successive horizontal lines.

17. The apparatus of claim 15, wherein transitions between successive values of the staircase voltage occur during a horizontal blanking interval.

18. The apparatus of claim 11, wherein the horizontal ramp generator generates a smooth ramp voltage.

19. The apparatus of claim 11, wherein the horizontal zoom frame signals define left and right sides of the zoom frame and occur at times during successive horizontal lines that correspond to the positions of the left and right sides on the display.

20. The apparatus of claim 11, wherein the vertical zoom frame signals define top and bottom sides of the zoom frame and occur during portions of first and second horizontal lines that correspond to the positions of the top and bottom sides on the display.

21. The apparatus of claim 11 further comprising means for producing a vertical bounds signal corresponding to the time that the vertical ramp is between said first and second thresholds, means for producing a horizontal bounds signal corresponding to the time that the horizontal ramp is between said first and second thresholds, first gate means for gating said horizontal zoom frame signals with the vertical bounds signal so as to inhibit the output of said horizontal zoom frame when the vertical bounds signal is not present, and second gate means for gating the vertical zoom frame signals with the horizontal bounds signal so as to inhibit the output of the horizontal zoom frame signals when the horizontal bounds signal is not present.

22. The apparatus of claim 1, wherein said zoom frame comprises a box having a black outline on said raster display, the box comprising first and second horizontal lines defining, respectively, top and bottom sides of the zoom frame and comprising first and second vertical lines defining, respectively, left and right sides of the zoom frame, and wherein said superimposing means comprises means for adding the zoom frame signals to a video signal being supplied to the raster display so as to cause black-level transitions in the video signal.

23. The apparatus of claim 1, wherein said optical system is a video camera, and said raster display is an operator's viewfinder display.

* * * * *